United States Patent [19]

Gruber

[11] 4,098,021

[45] Jul. 4, 1978

[54] CONTAINER FOR RESTRICTING THE GROWING SIZE OF PLANTS AND METHOD OF APPLYING THE SAME

[76] Inventor: Bruno Gruber, Ehbauer-Ring 2, 8031 Puchheim, Germany

[21] Appl. No.: 750,249

[22] Filed: Dec. 13, 1976

[30] Foreign Application Priority Data

Jan. 21, 1976 [DE] Fed. Rep. of Germany ....... 2602107

[51] Int. Cl.² .............................................. A01G 9/02
[52] U.S. Cl. ............................................ 47/66; 47/58
[58] Field of Search ........................ 47/58, 66, 79–80, 47/59

[56] References Cited

U.S. PATENT DOCUMENTS

| | | | |
|---|---|---|---|
| 1,928,810 | 10/1933 | Burford | 47/80 |
| 3,192,665 | 7/1965 | Cloud | 47/80 |

OTHER PUBLICATIONS

Botany, Hill et al., 1950, McGraw-Hill Book Co., Inc., p. 106.

*Primary Examiner*—Robert E. Bagwill
*Attorney, Agent, or Firm*—Finnegan, Henderson, Farabow & Garrett

[57] ABSTRACT

A container for rooted plants, seeds, seedlings or bulbs, made of corrosion resistant material, provided with a plurality of openings in its wall surfaces, open at the top. The size of the container and the wall openings is designed to permit nutrition of the plant from within and without the container when this is filled with a nutrient medium and set in an environment of nutrient medium. The girdling of roots is prevented. The size of the container and the wall openings are sufficiently small and rigid to prevent the plant from developing a root system that would permit the plant to grow beyond dwarfed size and to prevent an appreciable proportion of the roots from penetrating the walls.

A method for growing dwarfed plants employing the container is described.

17 Claims, 6 Drawing Figures

CONTAINER FOR RESTRICTING THE GROWING SIZE OF PLANTS AND METHOD OF APPLYING THE SAME

FIELD OF THE INVENTION

This invention relates in general to a method restricting plants from growing to the size typical for their species and age, so as to cultivate plants with drawfed growth.

DESCRIPTION OF THE PRIOR ART

The method preventing the growth of trees, developed particularly in Japan and California under the name of Bonzai culturing, is exceedingly complicated. It consists of a number of procedures, such as the cutting of roots, the reducing of branches and leaves as well as the pruning of young buds combined with the gradual reduction of the size of the plant pot and the use of soil low in nutrients. This method requires specialized knowledge and care as well as the application of the considerable amount of time by anyone practicing it.

From German Patent 935 393 a plant container of woven wire has become known. The woven wire is surrounded by a removable cover of synthetic foam. This container has the purpose of holding together the soil as a closed-off growth medium. It views as particulary advantageous the enclosing of the container in synthetic foam of moltopren plastic which gives both a decorative aspect to the pot and acts as an insulator for the retention of moisture. The flexible construction of the container walls is claimed to make possible the loosening of the soil within the container. A reserve of water can be added in the conventional manner to the saucer in which the container is set, permitting the absorption of the water through the bottom of the container which is not covered with foam.

Another method of constructing a plant pot, known from German Offenlegungsschrift No. 2 434 538 provides for lining the pot with open-celled soft foam. In the initial phase of growing plants, the soft foam prevents the roots from growing through the wall of the pot manufactured of conventional material. Once more the plant is nourished entirely from the inside of the container. When the plant has grown sufficiently large for transplanting, the outer container wall is removed and the plant together with the soft foam liner is planted at its ultimate location in an unrestricted area. In this phase of growth the soft foam no longer prevents the penetration of the roots which will grow into the surrounding soil. The container described in DT-OS 2 434 538 is claimed to induce a particularly rapid growth rate of plants, in which the soft foam lining has the function of storing to a certain extent water and air but especially to prevent the phenomenon known as root girdling. The latter is a generally known, undesirable occurrence, where the roots after reaching the container wall, continue growing tangentially to this wall without forming further active roots to a sufficient degree, thereby leading to aging and drying of the roots.

From British Pat. No. 1 186 730, a plant container is known, consisting of plastic wire or plaited jute. The container walls are formed of material commonly rolled. After unrolling the material the container's shape can be preserved by means such as retaining brackets. The container contains sufficient soil to nourish the plant from the inside of the container up to the time of transplanting. After transplantation, the roots will once more grow without impediment through the weave into the surrounding soil.

From the German Offenlegungsschrift No. 1 482 922 a plastic seed pot is known, having in its side wall surfaces approximately 40 openings of an approximate size of 2 mm × 4 mm each, to permit once more the penetration of roots, in this case of plants already in the seedling stage. This container must be removed upon transplantation and is equipped for the easy removal from the roots that have already penetrated, with slits which permit its separation from these roots without appreciably damaging these.

None of the above-cited inventions with openings in the container walls was created for the purpose of restricting the size of the growth of plants. Their construction does not make them suited as a means for the cultivation of plants of dwarfed growth. Their construction is in no way better suited than that of any other conventional plant pot to produce drawfed plants, other than by the complicated Bonzai method mentioned above.

SUMMERY OF THE INVENTION

In accordance with the invention, there is provided a method for the restriction of the growth size of plants, which dispenses with procedures that are complicated, which have to be carried out over a long period of time or which require specialized knowledge or previous experience. In accordance with the invention, the growth size of plants is restricted by simple means, permitting in the time predetermined by nature the healthy growth including the blooming of flowers, trees and shrubs.

The invention solves this problem by providing for openings in the container walls of such a size as to prevent at least the majority of the finest root structures of the plant concerned from penetrating through the openings. The requisite maximum size of the openings in the container walls depends in each case on the plant involved and may be determined without major effort, once and for all, for each species of plant, through tests with various perforated containers with graduated hole diameters. For the majority of conventional indoor plants, the desired effect is obtained with a hole diameter or width of from approximately 0.05 mm to about 0.3 mm, which will prevent penetration of a sufficient number of roots of the plant through the orifices. With a hole diameter or width of 0.1 mm, penetration of the walls by even finer roots of almost any plant is prevented, and with holes of about 0.05 mm in width, penetration of the walls by even the finest roots is virtually excluded.

BRIEF DESCRIPTION OF THE DRAWINGS

The invention is in the following described by means of drawings represented one model exemplifying it. In the drawings.

DESCRIPTION OF THE PREFERRED EMBODIMENT

Figure 1:
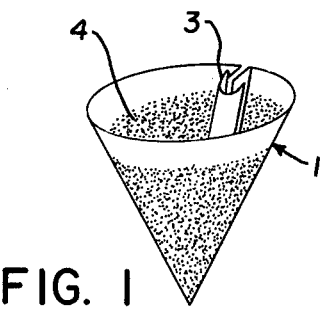
FIG. 1 is a view of the container.
Figure 4:
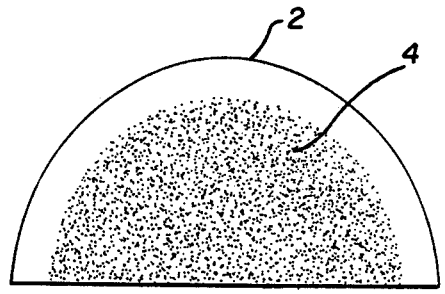
FIG. 4 is a flat section of material from which the container according to FIG. 1 can be formed.
Figure 2:
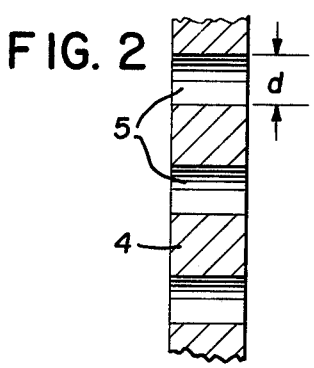
FIG. 2 is a greatly enlarged section through the wall of container of FIG. 1.
Figure 3:
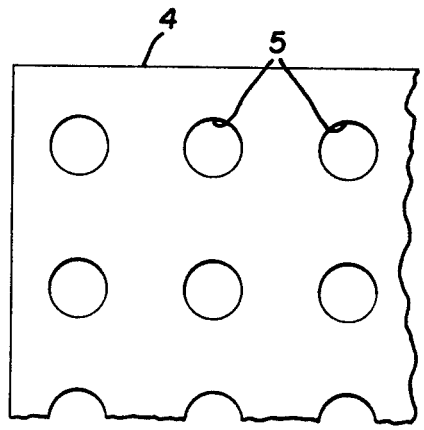
FIG. 3 is a greatly enlarged side view of a part of the wall of the container according to FIG. 1.

In the illustrated example container 1 is of conical shape, enabling its being formed easily from a flat section (FIG. 4) and its retention in this form by means of clip 3. While the specific shape of the container as shown in the example of the embodiment of the invention facilitates its production, this form is not essential for the creation of the effect according to the invention on the growth of the plant. Any other suitably appearing shape of container capable of being simply produced may be selected. By contrast, the size of the container is important. It should for conventional indoor plants not exceed 50 cubic centimeters. In the example shown, it is approximately of thimble size. The shaded part of the wall of the container 1 in FIGS. 1 and 4 is equipped with apertures 5 (FIGS. 2 and 3) with a diameter of the approximate order of 0.1 mm. Section 2 and thereby the wall of container 1 consist in the selected example of a thin sheet of stainless steel approximately 0.1 mm thick. Any other corrosion resistant material is equally suited for the container wall, e.g. also plastic materials. Basically, instead of a perforated sheet woven or nonwoven material with interstices between the threads or wires may be used. In such constructions a certain degree of stability of the openings is important so that under pressure from the roots a distortion of the structure and thereby an enlargement of the interstices does not take place.

The sufficiently small plant, a seed, a seedling or the bulb of a plant are placed into the container which holds a nutrient medium; and the size of the container is however so designed that the nutrient medium contained in it is greatly insufficient to nourish the plant to its normal growth size. The plant initially expands its roots in the direction of the container wall. As the roots touch the container wall they are not able to penetrate the small openings 5, except, perhaps, some of the finest roots. These few roots, however, are not sufficient to draw the nutrient from the soil surrounding container 1 in a quantity requisite for the normal growth of a plant. The roots along the inner wall of container 1 avoid the phenomenon of root girdling, otherwise observed in containers of insufficient size, i.e. the tangential continued growth of the root without the formation of a sufficient number of numerous additional fine roots. The finest roots appear to be arrested in growth with their endings facing openings 5 and extract the nutrient essential for the growth of the plant from the soil 6 surrounding container 1 or from another nutrient medium such as a nutrient solution in which container 1 is suspended. The extraction is effected in amounts determined by the size of the openings 5. Furthermore the stunting of the growth of roots seeking nutrients creates a maturing process in the plant so that the plant experiences a perfectly healthy albeit reduced growth. If seedlings are introduced into the container, these moreover grow with particular ease. For the nourishment required by most plants it is sufficient if at least 10% of the container surface wall is provided with openings. Some plants' nutrient needs will be satisfied by an even smaller proportion of the surface being provided with openings, e.g. cacti. Blooms formed appear normal and the plant produces, ambient temperatures permitting, normally matured seeds which however are also dwarfed.

Figure 5:
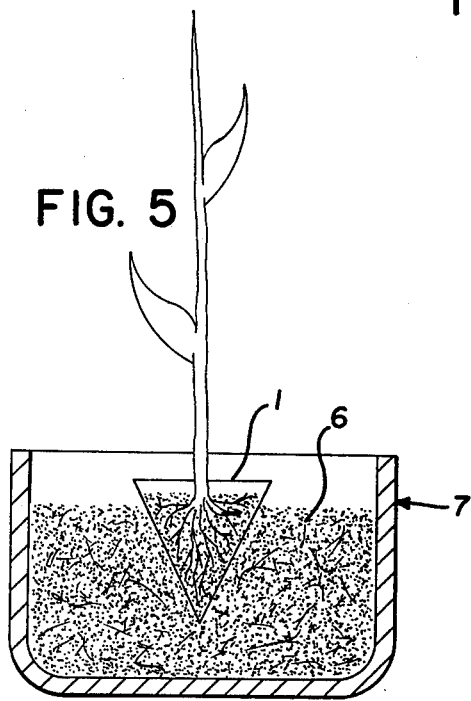
FIG. 5 shows the container according to FIG. 1 in a schematic representation, with a plant and inserted into an outer container (plant pot).
Figure 6:
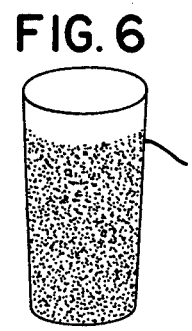
FIG. 6 is a view of another form of container embodying the invention.

The results obtained by this method are astounding. For instance, sunflowers placed in such a container reach one-tenth of normal linear, one one-thousandths of normal volumetric growth. The volume of the seeds however amounts to approximately one one-hundredth of normal size. Similar results have been obtained with leaf begonias. Pansies have by means of this method produced a linear growth reduced by approximately one-half. Geraniums while dwarfed in growth, showed normally sized blooms. With some plants changes were produced in the shape of the blooms and the leaf. Care of the plants grown in the container according to this invention differs little from the normal care of potted plants. Instead of the setting or suspending of the small container into a larger pot 7 as shown in FIG. 5, it is naturally possible to place the small container also in open ground. When setting the small container into a pot 7, the latter need not be of normal size. For this reason it is possible to accomodate for instance in a window display of flowering plants, a greater number of plants. An additional advantage is that the seeds produced by the dwarfed plants are considerably smaller than seeds grown from conventional plants, permitting a space saving when storing, preserving during the winter or transporting seeds intended for seeding. These miniature seeds will, when planted under unrestricted conditions, produce plants of the original size. The invention is also suited for comparative botanical testing. It has been shown that with a container according to the invention a substantially smaller ratio of roots, proportional to the total volume of the plant, in any stage of growth of the plant, is attainable than has been thought to be necessary hitherto.

What is claimed is:

1. A plant container comprising a receptacle having an upwardly facing opening formed from a corrosion resistant material and having holes formed therethrough, said holes having a width of approximately 0.05 mm to about 0.3 mm, said receptacle being adapted to contain a nutrient medium and the root portion of a plant and adapted to be placed in a pot containing a nutrient medium, said receptacle being sized so that its volume cannot contain a sufficient amount of nutrient necessary for normal growth of a plant growing therein, said receptacle having a sufficient number of holes therethrough to allow the plant roots in said receptacle to draw sufficient nutrients from outside said receptacle to nourish said plant.

2. A plant container as defined in claim 1 wherein said holes through said receptacle have a width of approximately 0.05 mm to about 0.1 mm.

3. A plant container as defined in claim 1 wherein said receptacle volume is no greater than 50 cc.

4. A plant container as defined in claim 1 wherein said holes formed through said receptacle comprise at least 10% of the surface of said receptacle.

5. A plant container as defined in claim 1 wherein said receptacle is constructed from sheet material selected from the group consisting of stainless steel and plastics.

6. A plant container as defined in claim 1 wherein said receptacle is constructed of woven wire or thread, the holes through said first receptacle being formed by interstices between the wires or threads.

7. A plant container as defined in claim 1 wherein said receptacle is generally cylindrical in shape having a bottom wall, a generally cylindrical side wall, and an open top, at least said side walls being provided with said holes.

8. A plant container as defined in claim 1 wherein said receptacle is funnel-shaped.

9. A plant cultivation system comprising a first receptacle having an upwardly facing opening formed from a corrosion resistant material and having holes formed therethrough, said holes having a width of approximately 0.05 mm to about 0.3 mm, said first receptacle having a nutrient medium and the root portion of a plant therein, a second receptacle larger than said first receptacle and containing a nutrient medium, said first receptacle being placed in said second receptacle, said first receptacle being sized so that its volume cannot contain a sufficient amount of nutrient necessary for normal growth of a plant growing therein, said first receptacle having a sufficient number of holes therethrough to allow the plant roots in said first receptacle to draw sufficient nutrients from the nutrient medium in said second receptacle to nourish said plant.

10. A cultivation system as defined in claim 9 wherein said holes through said first receptacle have a width of approximately 0.05 mm to about 0.1 mm.

11. A cultivation system as defined in claim 9 wherein said first receptacle volume is no greater than 50 cc.

12. A cultivation system as defined in claim 9 wherein said holes formed through said first receptacle comprise at least 10% of the surface of said first receptacle.

13. A cultivation system as defined in claim 9 wherein said first receptacle is constructed from sheet material selected from the group consisting of stainless steel and plastics.

14. A cultivation system as defined in claim 9 wherein said first receptacle is constructed of woven wire or thread, the holes through said first receptacle being formed by interstices between the wires or threads.

15. A method of growing dwarfed plants comprising the steps of providing a receptacle formed of corrosion resistant material having an open top and holes therethrough of a width of from about 0.05 mm to about 0.3 mm, placing a first nutrient medium in said receptacle and a plant propagating material in said first nutrient medium, and placing said receptacle in a pot containing a second nutrient medium, whereupon the growth of the plant resulting from said plant propagating material is dwarfed by the major portion of the roots of said plant being confined within said receptacle wall.

16. The method as defined in claim 15 wherein said first and second nutrient mediums are soil.

17. The method as defined in claim 15 wherein said plant propagating material is a seed, a seedling, a cutting, a bulb, or a small plant.

* * * * *